United States Patent [19]
Bae

[11] Patent Number: 5,808,706
[45] Date of Patent: Sep. 15, 1998

[54] THIN-FILM TRANSISTOR LIQUID CRYSTAL DISPLAY DEVICES HAVING CROSS-COUPLED STORAGE CAPACITORS

[75] Inventor: Byung-Seong Bae, Kyungki-do, Rep. of Korea

[73] Assignee: Samsung Electronics Co., Ltd., Suwon, Rep. of Korea

[21] Appl. No.: 821,062

[22] Filed: Mar. 19, 1997

[51] Int. Cl.[6] .......................... G02F 1/1343; G02F 1/1333
[52] U.S. Cl. .................................................. 349/38; 349/54
[58] Field of Search .................................... 349/38, 54, 39

[56] References Cited

U.S. PATENT DOCUMENTS

| 5,457,553 | 10/1995 | Mori | 349/39 |
| 5,623,350 | 4/1997 | Kawachi et al. | 349/38 |
| 5,701,166 | 12/1997 | Fedorovish et al. | 349/38 |

*Primary Examiner*—William L. Sikes
*Assistant Examiner*—Tiep H. Nguyen
*Attorney, Agent, or Firm*—Myers Bigel Sibley & Sajovec

[57] ABSTRACT

Liquid crystal display devices include a matrix of thin-film transistor (TFT) display cells and storage capacitors to capacitively cross-couple pixel electrodes of adjacent display cells together in an efficient manner to improve display resolution. A preferred display device includes a plurality of liquid crystal display cells and spaced storage capacitors which are directly cross-coupled between pixel electrodes of display cells in adjacent rows and/or columns of cells. Here, the spaced storage capacitors each have a first electrode electrically connected to a pixel electrode in one display cell and a second electrode spaced opposite the first electrode and electrically connected to a pixel electrode in another adjacent display cell in the same column or row of display cells. Preferably, the first electrodes of the storage capacitors are contiguous with the pixel electrodes of a respective display cell and the second electrodes of the storage capacitors are electrically connected at ends thereof to respective pixel electrodes by a conductive via. By directly cross-coupling pixel electrodes of closely adjacent display cells together, improved display resolution can be achieved. For example, in the event a pixel electrode of a display cell cannot be properly loaded, the data (e.g., charge) from closely adjacent cells can be shared efficiently by direct cross-coupling to improve overall display resolution, particularly when the data to be loaded into the adjacent display cells is the same.

18 Claims, 11 Drawing Sheets

THIN-FILM TRANSISTOR LIQUID CRYSTAL DISPLAY DEVICES HAVING CROSS-COUPLED STORAGE CAPACITORS

FIELD OF THE INVENTION

The present invention relates to display devices, and more particularly to liquid crystal display devices.

BACKGROUND OF THE INVENTION

In order to minimize the space required by display devices, research into the development of various flat panel display devices such as LCD display devices, plasma display panels (PDP) and electro-luminescence displays (EL), has been undertaken to displace larger cathode-ray tube displays (CRT) as the most commonly used display devices. Particularly, in the case of LCD display devices, liquid crystal technology has been explored because the optical characteristics of liquid crystal material can be controlled in response to changes in electric fields applied thereto. As will be understood by those skilled in the art, a thin film transistor liquid crystal display (TFT LCD) typically uses a thin film transistor as a switching device and the electrical-optical effect of liquid crystal molecules to display data visually.

At present, the dominant methods for fabricating liquid crystal display devices and panels are typically methods based on amorphous silicon (a-Si) thin film transistor technologies. Using these technologies, high quality image displays of substantial size can be fabricated using low temperature processes. As will be understood by those skilled in the art, conventional LCD devices typically include a transparent (e.g., glass) substrate with an array of thin film transistors thereon, pixel electrodes, orthogonal gate and data lines, a color filter substrate and liquid crystal material between the transparent substrate and color filter substrate. The use of a-Si TFT technology typically also requires the use of separate peripheral integrated circuitry to drive the gates and sources (i.e., data inputs) of the TFTs in the array. In particular, gate driving signals from a gate driving integrated circuit are typically transmitted to the gate electrodes of TFTs in respective rows and data driving signals from a data driving integrated circuit are typically transmitted to the source electrodes of TFTs in respective columns. A display is typically composed of a TFT substrate in which a plurality of liquid crystal pixels are formed. Each pixel typically has at least one TFT and a pixel electrode coupled to the drain of the respective TFT. Accordingly, the application of a gate driving signal to the gate of a TFT will electrically connect the pixel electrode of a respective TFT to the data line connected thereto.

Referring to now to FIG. 1, a first TFT LCD display cell of a conventional TFT LCD display device is illustrated. Each cell comprises a TFT transistor having a source electrode (S) connected to a data line (DL), a gate electrode (G) connected to a gate line (GL) and a drain electrode (D) connected to a respective pixel electrode internal to the cell. As will be understood by those skilled in the art, a storage capacitor (Cst1) is utilized to sustain the pixel electrode voltage during holding periods and the liquid crystal capacitor ($C_{LC}$) is connected in series between a respective pixel electrode and a common electrode (Vcom) of a color filter substrate. The storage capacitor also has an electrode connected to a common electrode line (CL). The storage capacitors of adjacent display cells also have electrodes which are connected to the common electrode line (CL). However, as will be understood by those skilled in the art, the use of an independent common electrode line for each row of display cells decreases the display device's aperture ratio.

Referring to now to FIG. 2, another conventional TFT LCD display device is illustrated comprising an array of TFT LCD display cells. In particular, a column of display cells is illustrated. Each cell comprises a TFT transistor having a source electrode connected to a data line (DL), a gate electrode connected to a gate line (GL) and a drain electrode connected to a respective pixel electrode internal to the cell. As illustrated, the liquid crystal capacitors ($C_{LC}$) are connected in series between respective pixel electrodes and a common reference potential (Vcom) and the storage capacitors in each column of cells are connected in series between respective pixel electrodes and a next lower order gate line (GL). Unfortunately, although the aperture ratio of the device of FIG. 2 may be greater than the aperture ratio of the device of FIG. 1, the parasitic capacitance of each gate line (GL) is relatively high in the device of FIG. 2. Moreover, in the event any of the TFTs in the devices of FIGS. 1 and 2 are defective, the voltage on the corresponding pixel electrode may be driven to a level which is significantly different than the value of the data to be loaded into the defective cell and this can corrupt the fidelity of the final displayed image.

Accordingly, notwithstanding the above described display devices, there still continues to be a need for improved display devices which have high aperture ratio and reduced parasitic gate line capacitance.

SUMMARY OF THE INVENTION

It is therefore an object of the present invention to provide improved liquid crystal display (LCD) devices.

It is another object of the present invention to provide liquid crystal display devices with reduced susceptibility to display deterioration caused by defective display cells.

It is still another object of the present invention to provide liquid crystal display devices with reduced susceptibility to display deterioration caused when pixel electrodes of display cells cannot be properly loaded with display data.

These and other objects, advantages and features of the present invention are provided by liquid crystal display devices which contain a matrix of thin-film transistor (TFT) display cells and use storage capacitors to capacitively cross-couple pixel electrodes of adjacent display cells together in an efficient manner to improve display resolution. In particular, a display device according to a preferred embodiment of the invention includes a plurality of liquid crystal display cells and spaced storage capacitors which are directly cross-coupled between pixel electrodes of display cells in adjacent rows and/or columns of cells. Here, the spaced storage capacitors each have a first electrode electrically connected to a pixel electrode in one display cell and a second electrode spaced opposite the first electrode and electrically connected to a pixel electrode in another adjacent display cell in the same column or row of display cells. Preferably, the first electrodes of the storage capacitors are contiguous with the pixel electrodes of a respective display cell and the second electrodes of the storage capacitors are electrically connected at ends thereof to respective pixel electrodes by a conductive via. By directly cross-coupling pixel electrodes of closely adjacent display cells together, improved display resolution can be achieved. For example, in the event a pixel electrode of a display cell cannot be properly loaded, the data (e.g., charge) from closely adjacent cells can be shared efficiently by direct cross-coupling to improve overall display resolution, particularly when the data to be loaded into the adjacent display cells is the same.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 3:
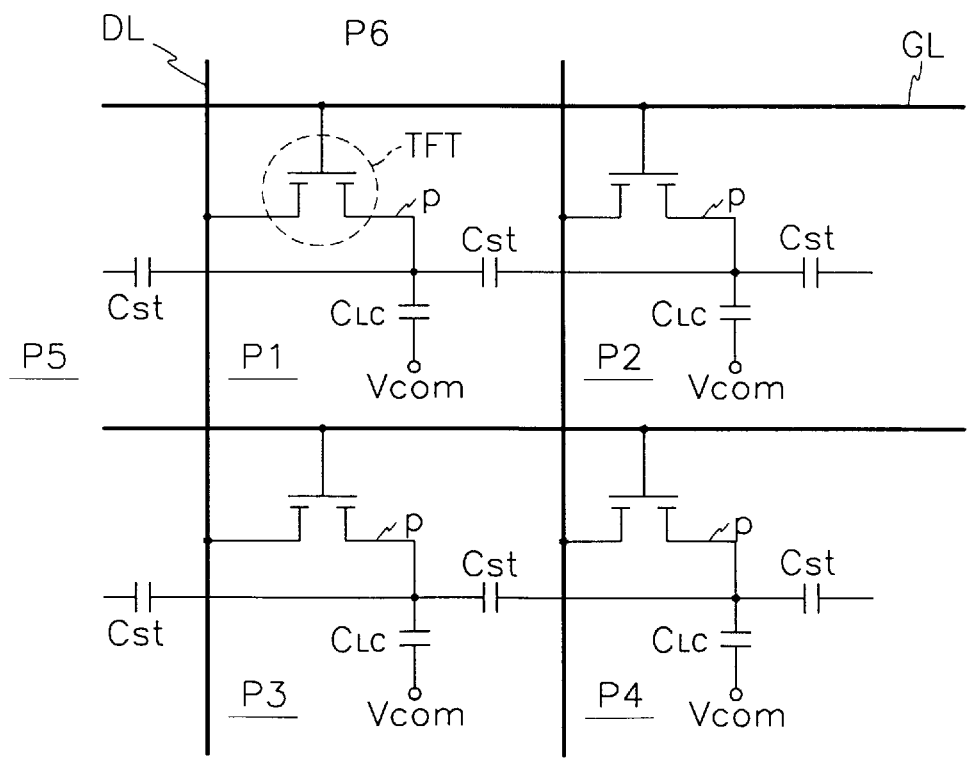
FIG. 3 is an electrical schematic of a TFT LCD display device according to a first embodiment of the present invention.

Referring now to FIGS. 3–7, a preferred thin-film transistor (TFT) liquid crystal display device according to a first embodiment of the present invention will be described. As illustrated by FIG. 3, a preferred liquid crystal display device includes a plurality of liquid crystal display cells (P1, P2, P3, . . . , PN) arranged as a two-dimensional matrix of rows and columns of display cells. As described herein, rows of display cells are controlled by respective gate lines (GL) and columns of display cells can be turned-on to receive data from respective data lines (DL). Typically, the display cells in a particular column are turned-on in sequence as each gate line is triggered.

Each display cell may comprise a thin-film field effect transistor (TFT) having a source electrically connected to a data line (DL), a gate electrically connected to a gate line (GL) and a drain electrically connected to a respective pixel electrode (p). As will be understood by those skilled in the art, each pixel electrode may comprise a primary electrode of a liquid crystal capacitor $C_{LC}$ and a primary electrode of a storage capacitor as explained more fully hereinbelow. Each pixel electrode (p) is typically spaced by a liquid crystal material from a common electrode ($V_{com}$) which may be connected to a color filter substrate (not shown). This common electrode typically constitutes a common secondary electrode of each liquid crystal capacitor. By turning on a plurality of TFTs in a common row of display cells by applying a predetermined gate line voltage to a respective gate line (GL), display data from a plurality of data lines (DL) can be loaded into the pixel electrodes of a row of cells. Moreover, according to a preferred aspect of the first embodiment of the present invention, each pixel electrode is directly cross-coupled to its next adjacent neighbor pixel electrodes by respective storage capacitors ($C_{st}$).

Figure 1:
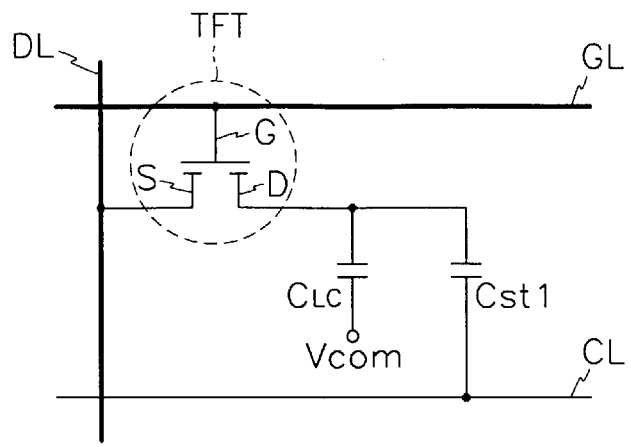
FIG. 1 is an electrical schematic of a first conventional TFT LCD display device.
Figure 2:
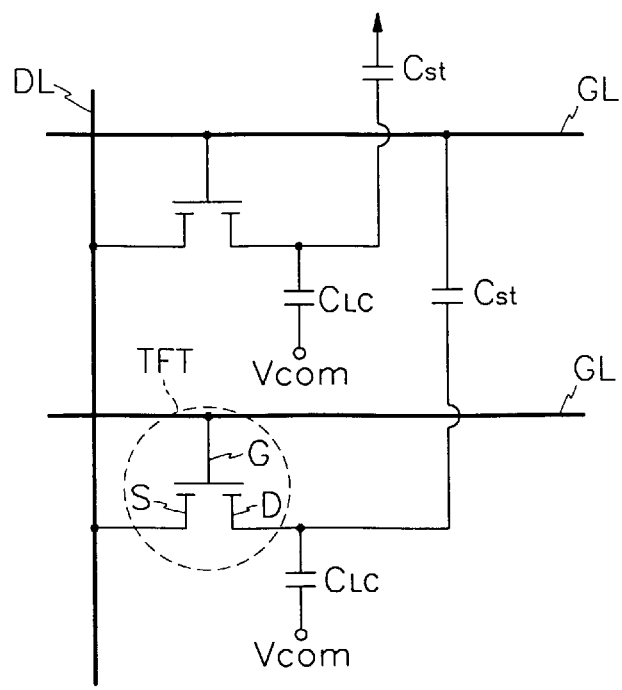
FIG. 2 is an electrical schematic of a second conventional TFT LCD display device.
Figure 4:
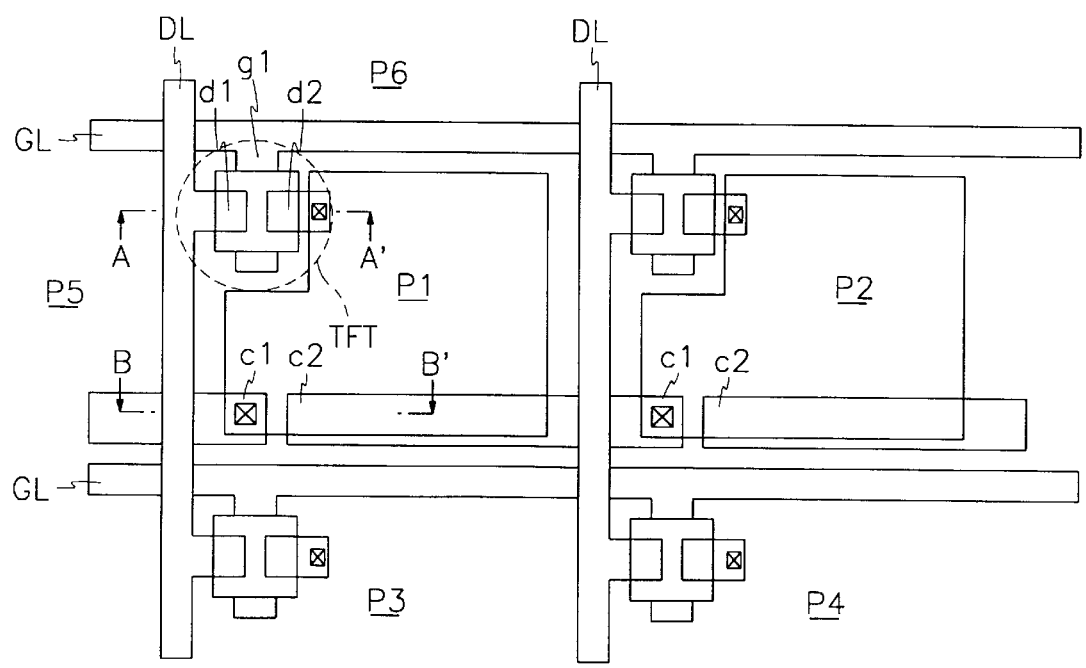
FIG. 4 is a layout schematic of a TFT LCD display device according to the first embodiment of the present invention.

Referring now to FIG. 4, a preferred layout schematic of the device of FIG. 3 is illustrated. Here, the designations "DL" refer to a plurality of spaced data lines which are electrically connected to and contiguous with source electrodes (d1) of a plurality of TFTs in a column; the designations "GL" refer to a plurality of spaced gate lines which are electrically connected to and contiguous with gates (g1) of a plurality of TFTs in a row; and the designations "P1", "P2", "P3" and "P4" refer to a plurality of pixel electrodes which are electrically connected by conductive vias to drain electrodes (d2) of respective TFTs. In addition, the designations "c1" and "c2" refer to opposing ends of respective storage capacitor electrodes which are spaced from each other as a string of electrodes in each row of cells. As illustrated, each storage capacitor electrode is electrically connected by a conductive via to a pixel electrode in one cell and capacitively coupled to a pixel electrode in another adjacent cell. Thus, the plurality of pixel electrodes in each row are not capacitively coupled to a continuous common line (CL) as illustrated by the prior art device of FIG. 1, but, instead, are directly cross-coupled to adjacent pixel electrodes by discrete storage capacitor electrodes.

By directly cross-coupling pixel electrodes of closely adjacent display cells together, improved display resolution can be achieved. For example, in the event a pixel electrode of a display cell cannot be properly loaded, the data (e.g., charge) from closely adjacent cells can be shared efficiently by direct cross-coupling to improve overall display resolution, particularly when the data to be loaded into the adjacent display cells is the same. As illustrated best by FIG. 7, which is an enlarged version of the electrical schematic of FIG. 3, the reduced image quality resulting from a defective connection (e.g., an electrical "open") between a pixel electrode and a TFT of a first display cell P1 can be compensated for by the charge sharing which occurs between the cross-coupled second and fifth display cells P2 and P5, respectively. Thus, even though image or display data cannot be loaded into the first display cell P1 because of the "open" between the drain of the TFT and the pixel electrode, the transmittivity of the liquid crystal material associated with the first display cell (which is a function of the voltage of the first cell's pixel electrode) is directly influenced by the voltage established on the pixel electrodes of the second and fifth display cells P2 and P5 (i.e., the display data loaded into the second and fifth display cells). Accordingly, because the data displayed by closely adjacent display cells will typically be the same or, at least more nearly the same than the average of the data displayed by an entire row of display cells, a display according to the present invention can have high fidelity even if defects are present.

Figure 5:
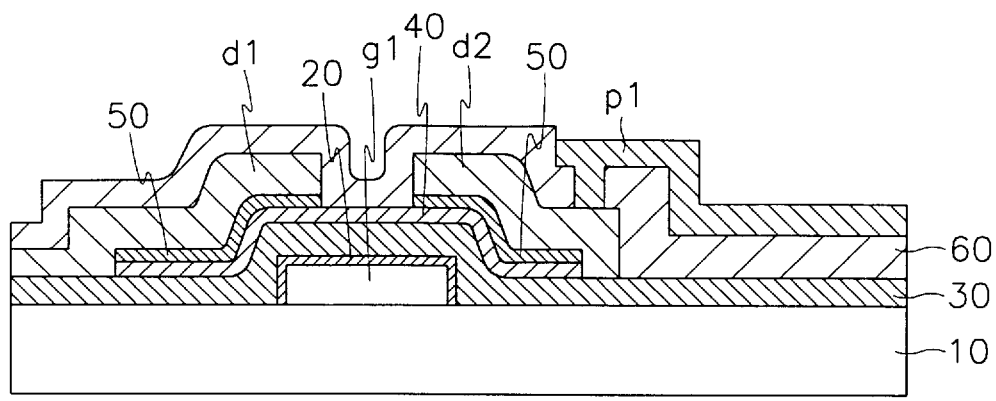
FIG. 5 illustrates a cross-sectional view of the TFT LCD display device of FIG. 4, taken along line A-A'.
Figure 6:
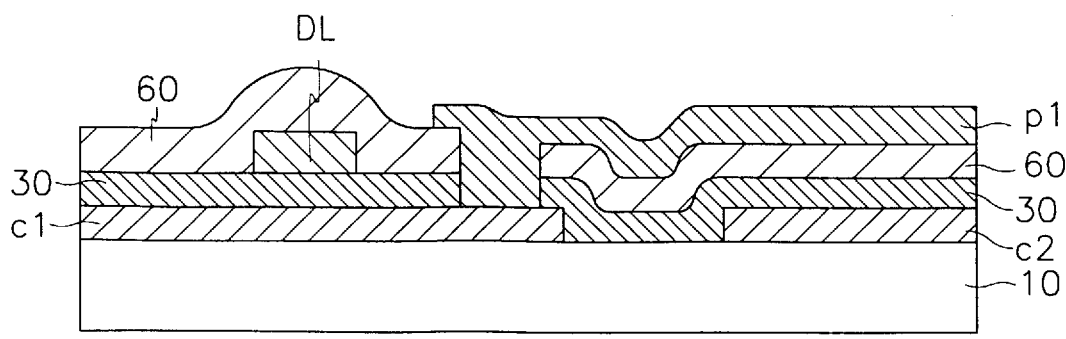
FIG. 6 illustrates a cross-sectional view of the TFT LCD display device of FIG. 4, taken along line B-B'.
Figure 7:
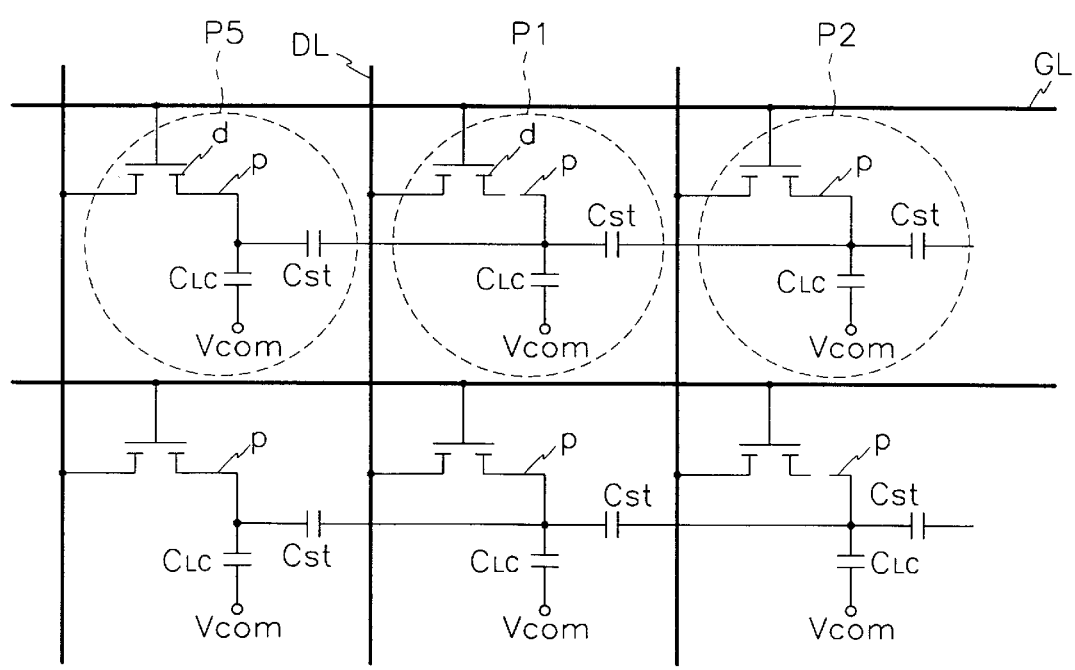
FIG. 7 is an electrical schematic of the TFT LCD display device of FIG. 3, but with pixel electrode defects therein.

Referring now to FIGS. 5 and 6, the steps of fabricating the display device of FIGS. 3 and 4 will be described. In particular, FIG. 5 illustrates a cross-sectional view of the TFT LCD display device of FIG. 4, taken along line A-A' and FIG. 6 illustrates a cross-sectional view of the TFT LCD display device of FIG. 4, taken along line B-B'. As illustrated by FIG. 5, a TFT of a preferred display cell can be formed by patterning a gate electrode g1 on a face of a substrate 10 and then forming a first electrically insulating layer 30 on the gate electrode g1 as illustrated. Here, the gate electrode may be patterned from a layer of at least one material such as aluminum (Al) and then an anodic oxidation layer 20 may be formed using conventional techniques. A first amorphous silicon (a-Si) layer 40, having a thickness in a range between about 400Å and 500Å is then formed on the first electrically insulating layer 30, as illustrated. Next, a relatively highly doped (e.g., N+) second amorphous silicon layer 50 is formed on the first amorphous silicon layer 40. The first and second amorphous silicon layers 40 and 50 are also patterned as illustrated. In particular, the second amorphous silicon layer 50 is patterned into highly doped source and drain contact regions. A layer of metallization or other preferred conductive material is then formed on the second amorphous silicon layer 50 and patterned to define a source electrode (d1) and a drain electrode (d2). A second electrically insulating layer 60 may then be formed on the source and drain electrodes d1 and d2 and on the first electrically insulating layer 30. A contact via may then be patterned through the second electrically insulating layer 60 to expose the drain electrode d2. Another layer of metallization may then be formed on the second electrically insulating layer 60 and patterned to define a pixel electrode (p1). Here, the pixel electrode may be formed of a metal such as aluminum (Al), chromium (Cr) or an alloy of molybdenum and tantalum (MoTa), having a thickness in a range between about 1500Å and 3000Å.

Referring now to FIG. 6, a method of fabricating a preferred display cell also includes the steps of patterning a plurality of spaced storage capacitor electrodes (having ends c1 and c2) during the step of patterning the gate electrode g1, as illustrated by FIG. 5. Here, the storage capacitor electrode may be patterned from a layer of at least one material such as aluminum (Al). The first electrically insulating layer 30 is also patterned on the storage capacitor electrodes to define a via which exposes an end of each electrode. The pixel electrode (p1) of each cell is also patterned in the via which exposes a respective storage capacitor electrode (at the c1 end) so that a direct electrical connection can be made. As illustrated, however, each opposing end c2 of a storage capacitor electrode is capacitively coupled to a pixel electrode of an adjacent cell and the first electrically insulating layer 30 acts as a dielectric material between each pixel electrode and an end c2 of each storage capacitor electrode. Referring still to FIG. 6, a data line (DL) can also be formed on the first electrically insulating layer 30 during the steps of forming the source and drain electrodes d1 and d2.

Figure 8:
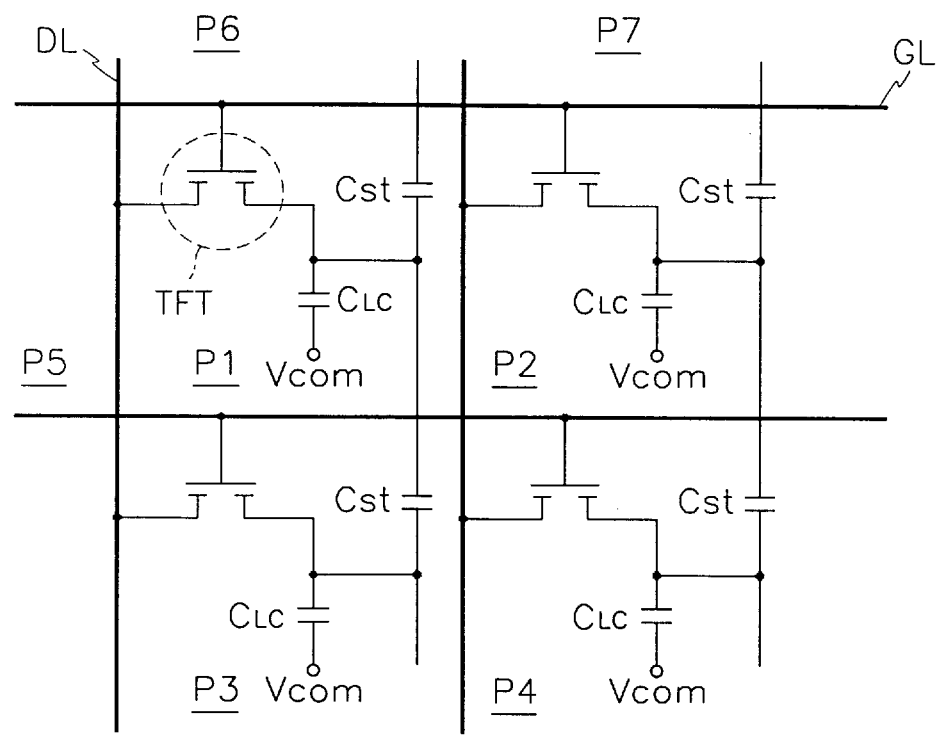
FIG. 8 is an electrical schematic of a TFT LCD display device according to a second embodiment of the present invention.

Referring now to FIGS. 8–12, a preferred thin-film transistor (TFT) liquid crystal display device according to a second embodiment of the present invention will be described. As illustrated by FIG. 8, a preferred liquid crystal display device includes a plurality of liquid crystal display cells (P1, P2, P3, . . . , PN) arranged as a two-dimensional matrix of rows and columns of display cells. Each display cell may comprise a thin-film field effect transistor (TFT) having a source electrically connected to a data line (DL), a gate electrically connected to a gate line (GL) and a drain electrically connected to a respective pixel electrode (p). By turning on a plurality of TFTs in a common row of display cells by applying a predetermined gate line voltage to a respective gate line (GL), display data from a plurality of data lines (DL) can be loaded into the pixel electrodes of a row of cells. Moreover, according to a preferred aspect of the second embodiment of the present invention, each pixel electrode is directly cross-coupled to its next adjacent neighbor pixel electrodes (in the same column of cells) by respective storage capacitors ($C_{st}$).

Figure 9:
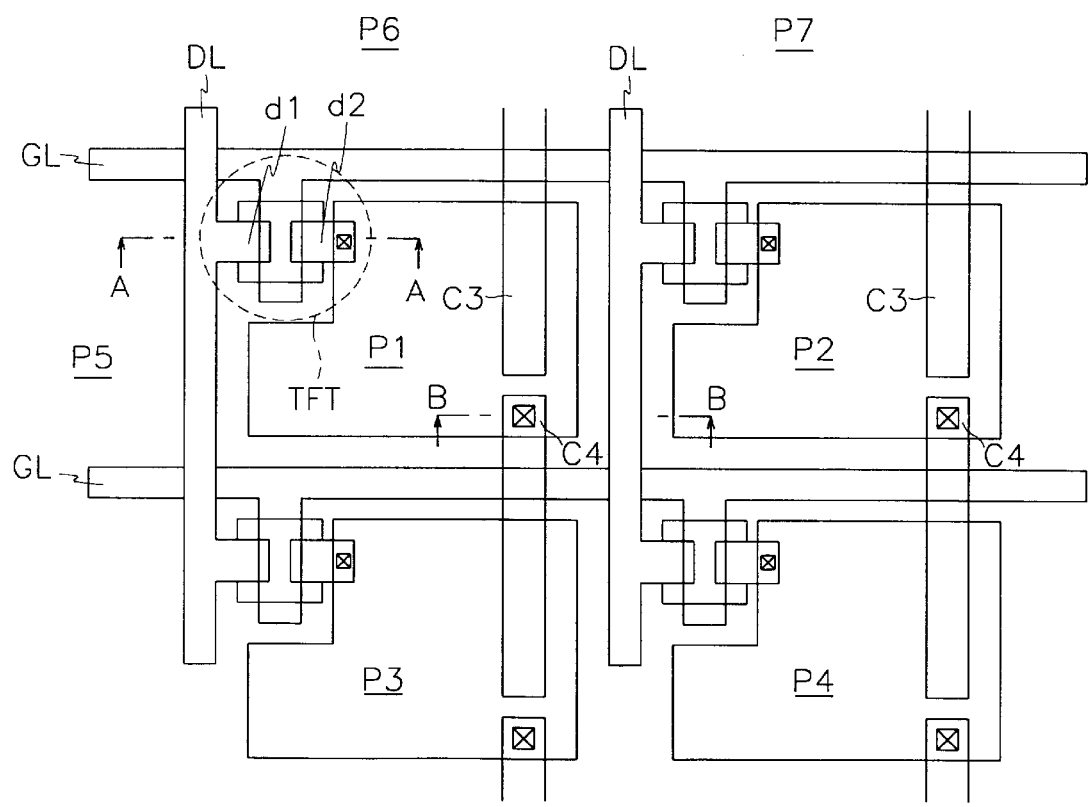
FIG. 9 is a layout schematic of a TFT LCD display device according to the second embodiment of the present invention.

Referring now to FIG. 9, a preferred layout schematic of the device of FIG. 8 is illustrated. Here, the designations "DL" refer to a plurality of spaced data lines which are electrically connected to and contiguous with source electrodes (d1) of a plurality of TFTs in a column; the designations "GL" refer to a plurality of spaced gate lines which are electrically connected to and contiguous with gates of a plurality of TFTs in a row; and the designations "P1", "P2", "P3" and "P4" refer to a plurality of pixel electrodes which are electrically connected by conductive vias to drain electrodes (d2) of respective TFTs. In addition, the designations "c3" and "c4" refer to opposing ends of respective storage capacitor electrodes which are spaced from each other as a string of electrodes in each column of cells. As illustrated, each storage capacitor electrode is electrically connected by a conductive via to a pixel electrode in one cell and capacitively coupled to a pixel electrode in another adjacent cell in the same column. Thus, the plurality of pixel electrodes in each column are directly cross-coupled to adjacent pixel electrodes in the same column. By directly cross-coupling pixel electrodes of closely adjacent display cells together, improved display resolution can be achieved as described more fully hereinabove.

Figure 10:
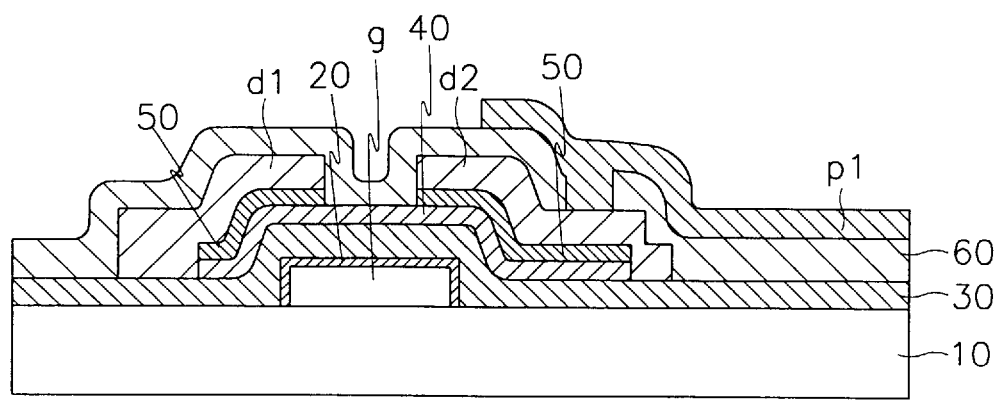
FIG. 10 illustrates a cross-sectional view of the TFT LCD display device of FIG. 9, taken along line A—A.
Figure 11:
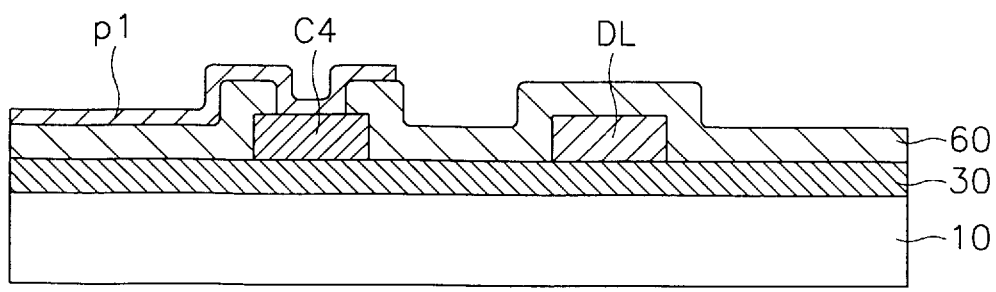
FIG. 11 illustrates a cross-sectional view of the TFT LCD display device of FIG. 9, taken along line B—B.
Figure 12:
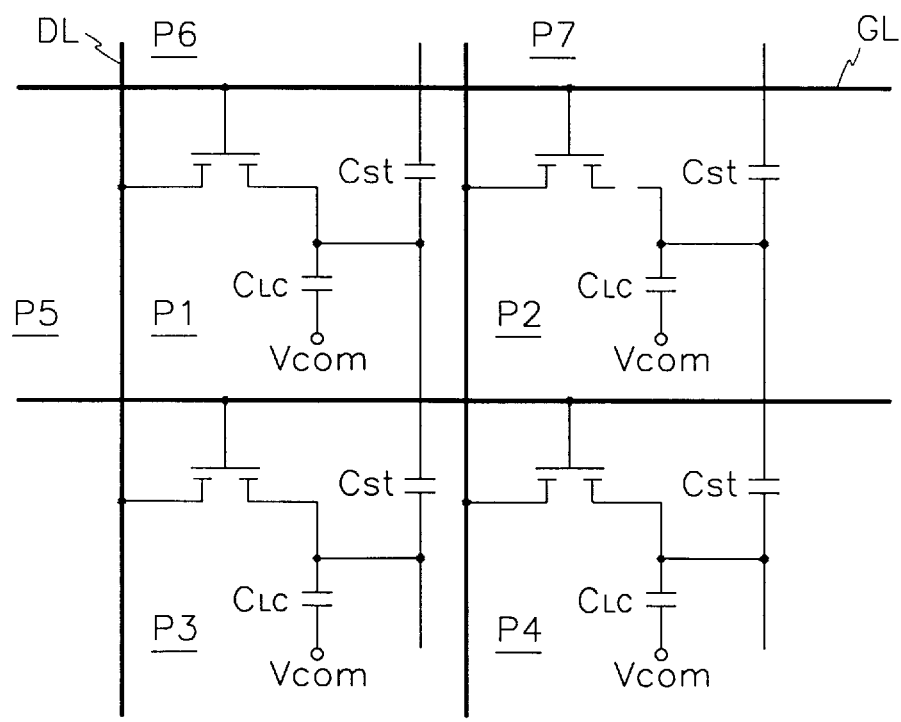
FIG. 12 is an electrical schematic of the TFT LCD display device of FIG. 8, but with pixel electrode defects therein.

Referring now to FIGS. 10 and 11, the steps of fabricating the display device of FIGS. 8 and 9 will be described. In particular, FIG. 10 illustrates a cross-sectional view of the TFT LCD display device of FIG. 9, taken along line A—A and FIG. 11 illustrates a cross-sectional view of the TFT LCD display device of FIG. 9, taken along line B—B. As illustrated by FIG. 10, a TFT of a preferred display cell can be formed by patterning a gate electrode g on a face of a substrate 10 and then forming a first electrically insulating layer 30 on the gate electrode g as illustrated. Here, the gate electrode may be patterned from a layer of at least one material such as aluminum (Al) and then an anodic oxidation layer 20 may be formed using conventional techniques. A first amorphous silicon (a-Si) layer 40, having a thickness in a range between about 400Å and 500Å is then formed on the first electrically insulating layer 30, as illustrated. Next, a relatively highly doped (e.g., N+) second amorphous silicon layer 50 is formed on the first amorphous silicon layer 40. The first and second amorphous silicon layers 40 and 50 are also patterned as illustrated. In particular, the second amorphous silicon layer 50 is patterned into highly doped source and drain contact regions. A layer of metallization or other preferred conductive material is then formed on the second amorphous silicon layer 50 and patterned to define a source electrode (d1) and a drain electrode (d2). A second electrically insulating layer 60 may then be formed on the source and drain electrodes d1 and d2 and on the first electrically insulating layer 30. A contact via may then be patterned through the second electrically insulating layer 60a to expose the drain electrode d2. Another layer of metallization may then be formed on the second electrically insulating layer 60a and patterned to define a pixel electrode (p1). Here, the pixel electrode may be formed of a metal such as aluminum (Al), chromium (Cr) or an alloy of molybdenum and tantalum (MoTa), having a thickness in a range between about 1500Å and 3000Å. Referring now to FIG. 11, a method of fabricating a preferred display cell also includes the steps of patterning a plurality of spaced storage capacitor electrodes (having ends c3 and c4) and data lines (DL) on the first electrically insulating layer 30, during the step of patterning the source and drain electrodes d1 and d2, as illustrated by FIG. 10. A second electrically insulating layer 60 is then deposited and patterned to expose an end of a storage electrode (at the C4 end). As described above with respect to FIG. 10, the pixel electrode (p1) of each cell is also patterned on the exposed portion of a respective storage capacitor so that a direct electrical connection can be made.

Figure 13:
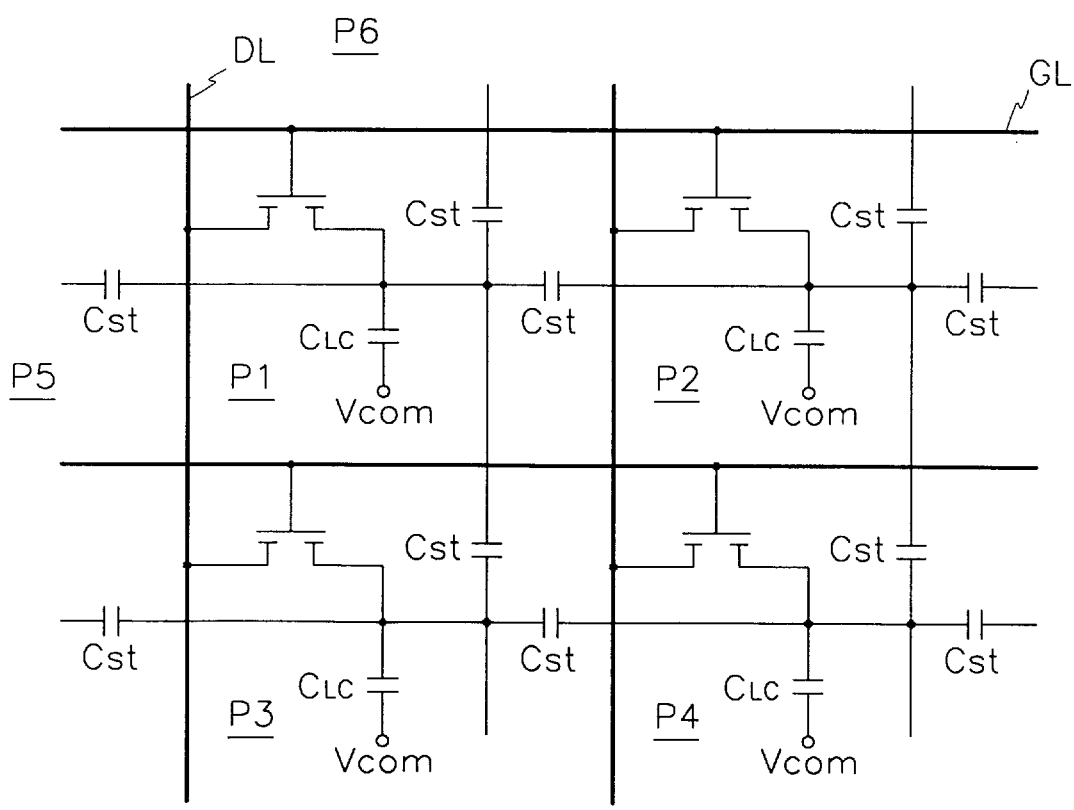
FIG. 13 is an electrical schematic of a TFT LCD display device according to a third embodiment of the present invention.
Figure 14:
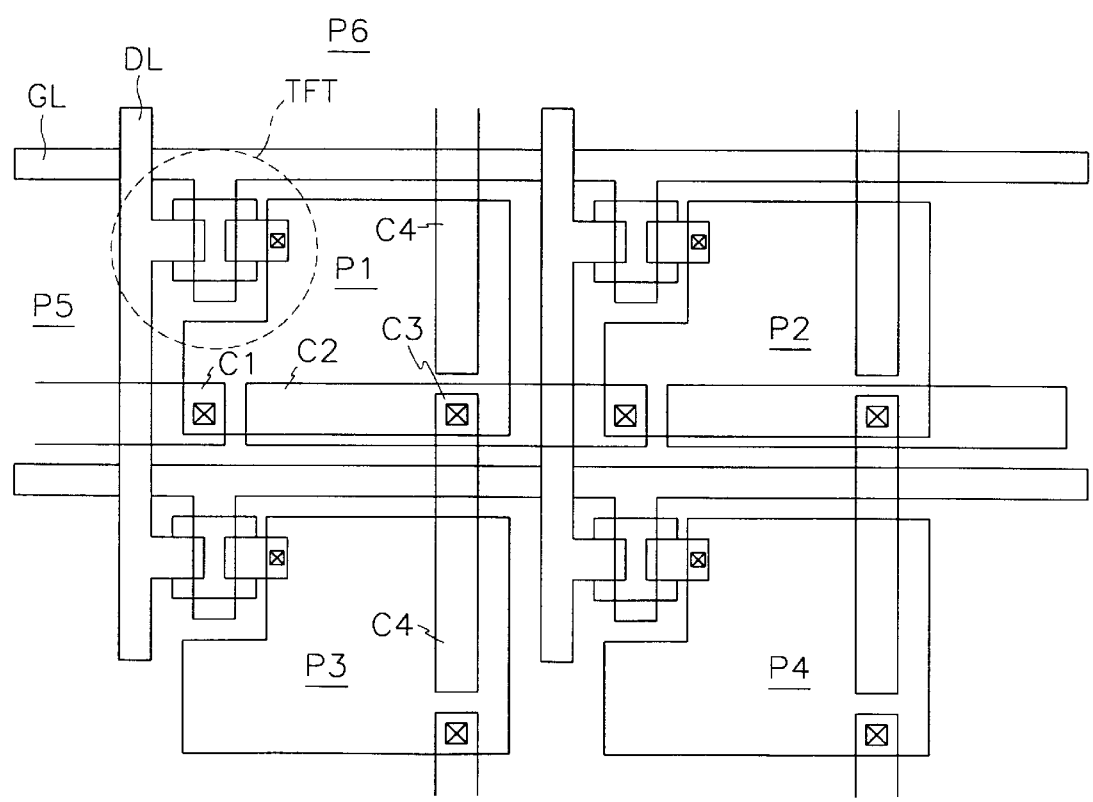
FIG. 14 is a layout schematic of a TFT LCD display device according to the third embodiment of the present invention.

Referring now to FIGS. 13–14, a preferred thin-film transistor (TFT) liquid crystal display device according to a third embodiment of the present invention will be described. In particular, the display device of FIG. 13 is similar to the display devices of FIGS. 3 and 8, however, each pixel electrode of a display cell is directly cross-coupled to four (4) of its next adjacent neighbor pixel electrodes. Two of the neighbor cells are in the same row and two are the same column. For example, as illustrated by FIG. 14, a first storage capacitor electrode is electrically connected at a first end C1 to a pixel electrode in a first display cell P1 and is capacitively coupled at a second end C2 to a pixel electrode in a fifth display cell P5. In addition, a second storage capacitor electrode is electrically connected at a first end C3 to a pixel electrode in a first display cell P1 and is capacitively coupled at a second end C4 to a pixel electrode in a third display cell P3. Accordingly, even if image or display data cannot be loaded into the first display cell P1 because the drain of the TFT and the pixel electrode are disconnected, the transmittivity of the liquid crystal material associated with the first display cell (which is a function of the voltage of the first cell's pixel electrode) is directly influenced by the voltage established on the pixel electrodes of the second and fifth display cells P2 and P5 (i.e., the display data loaded into the second and fifth display cells) and the voltage established on the pixel electrodes of the third and sixth display cells P3 and P6. As described above, in most display situations the data displayed by closely adjacent display cells will be approximately the same or, at least, more nearly the same than the average of the data displayed by an entire row of display cells or an entire column of display cells. Thus, the value of the pixel electrode voltage of a defective cell can typically be made to approximate the value it would have if not defective which means that high fidelity images can be produced even if defects are present.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A thin-film transistor liquid crystal display device, comprising:
    a plurality of liquid crystal display cells having pixel electrodes therein; and
    a plurality of storage capacitors, each of said plurality of storage capacitors having a first electrode electrically connected to a pixel electrode in one display cell and a second electrode spaced opposite the first electrode and electrically connected to a pixel electrode in another display cell.

2. The display device of claim 1, wherein said plurality of liquid crystal display cells are electrically coupled to a common data line.

3. The display device of claim 1, wherein said plurality of liquid crystal display cells are electrically coupled to a common gate line.

4. The display device of claim 1, wherein the second electrodes of said plurality of storage capacitors are spaced from each other and arranged end-to-end as a string of spaced electrodes.

5. The display device of claim 1, wherein said plurality of liquid crystal display cells are arranged as a matrix of display cells having rows and columns of display cells therein; and wherein the second electrodes of said plurality of storage capacitors are electrically connected to pixel electrodes of display cells in a first row thereof.

6. The display device of claim 5, wherein each of the pixel electrodes of display cells in the first row thereof is electrically connected to a respective third electrode; and wherein each of the third electrodes is capacitively coupled to a pixel electrode of a respective display cell in a second row thereof.

7. The display device of claim 1, wherein said plurality of liquid crystal display cells are arranged as a matrix of display cells having rows and columns of display cells therein; and wherein the second electrodes of said plurality of storage capacitors are electrically connected to pixel electrodes of display cells in a first column thereof.

8. A thin-film transistor liquid crystal display device, comprising:
    a plurality of liquid crystal display cells having pixel electrodes therein; and
    a first plurality of spaced storage capacitor electrodes, each of said first plurality of spaced storage capacitor electrodes capacitively coupled to a respective pixel electrode in one display cell and electrically connected to a respective pixel electrode in another display cell.

9. The display device of claim 8, wherein said plurality of liquid crystal display cells are arranged as a matrix of display cells having rows and columns of display cells therein; and wherein said first plurality of storage capacitor electrodes are electrically connected to pixel electrodes of display cells in a first row thereof.

10. The display device of claim 8, wherein said plurality of liquid crystal display cells are arranged as a matrix of display cells having rows and columns of display cells therein; and wherein said first plurality of storage capacitor electrodes are electrically connected to pixel electrodes of display cells in a first column thereof.

11. The display device of claim 9, further comprising a second plurality of spaced storage capacitor electrodes, each of said second plurality of spaced storage capacitor electrodes electrically connected to a respective pixel electrode of a display cell in the first row of display cells and capacitively coupled to a respective pixel electrode of a display cell in a second row of display cells.

12. The display device of claim 9, further comprising a plurality of data lines which are each spaced between display cells in adjacent columns thereof; wherein each of the columns of display cells is operatively coupled to a respective data line; and wherein said first plurality of storage capacitor electrodes overlap or underlie respective data lines.

13. The display device of claim 12, wherein said first plurality of storage capacitor electrodes are arranged end-to-end as a string of electrodes.

14. The display device of claim 10, further comprising a plurality of gate lines which are each spaced between display cells in adjacent rows thereof; wherein each of the rows of display cells is operatively coupled to a respective gate line; and wherein said first plurality of storage capacitor electrodes overlap or underlie respective gate lines.

15. The display device of claim 8, wherein each of said first plurality of spaced storage capacitor electrodes is separated from the respective pixel electrode in one display cell by an electrically insulating region and electrically connected through a via in the electrically insulating region to the respective pixel electrode in another display cell.

16. The display device of claim 1, wherein each of the first electrodes of said plurality of storage capacitors is contiguous with a respective pixel electrode in said plurality of liquid crystal display cells.

17. A liquid crystal display device, comprising:
   a control line;
   a first plurality of liquid crystal display cells operatively connected to said control line as a first row or first column of display cells;
   a second plurality of liquid crystal display cells extending adjacent said control line; and
   a plurality of storage capacitor electrodes, each of said plurality of storage capacitor electrodes electrically connected to a pixel electrode of a respective display cell in said first plurality thereof and capacitively coupled to a pixel electrode of a respective display cell in said second plurality thereof.

18. The display device of claim 17, wherein said plurality of storage capacitor electrodes overlap or underlie said control line; and wherein said control line comprises a data line or gate line.

* * * * *